United States Patent [19]
Becker et al.

[11] Patent Number: 5,876,017
[45] Date of Patent: Mar. 2, 1999

[54] PLUMBING FIXTURE CARRYING DRINKING WATER COMPRISED OF A COPPER ALLOY

[75] Inventors: Walter Becker; Herbert Reinecke, both of Iserlohn, Germany

[73] Assignee: Masco Corporation of Indiana, Indianapolis, Ind.

[21] Appl. No.: 532,736

[22] PCT Filed: Jan. 19, 1995

[86] PCT No.: PCT/US95/00678

§ 371 Date: May 30, 1996

§ 102(e) Date: May 30, 1996

[87] PCT Pub. No.: WO95/22028

PCT Pub. Date: Aug. 17, 1995

[30] Foreign Application Priority Data

Feb. 8, 1994 [DE] Germany ............................ 44 04 194.2

[51] Int. Cl.⁶ ...................................................... B03C 1/04
[52] U.S. Cl. ............................ 251/368; 137/801; 137/375
[58] Field of Search ............................... 251/368; 137/801, 137/375

[56] References Cited

U.S. PATENT DOCUMENTS

| | | | |
|---|---|---|---|
| 3,050,608 | 8/1962 | Woody | 251/368 |
| 3,557,824 | 1/1971 | Krehbiel | 251/368 |
| 3,630,223 | 12/1971 | Schaverien | 251/368 |
| 3,733,106 | 5/1973 | Rike et al. | 251/368 |
| 4,044,993 | 8/1977 | Wheeler | 251/368 |
| 4,162,680 | 7/1979 | Coch | 118/76 |
| 5,579,808 | 12/1996 | Mikol et al. | 137/375 |

*Primary Examiner*—A. Michael Chambers
*Attorney, Agent, or Firm*—Myron B. Kapustij; Leon E. Redman

[57] ABSTRACT

A plumbing fixture (10) for carrying drinking water comprised of metal, particularly of copper and its alloys with portions of zinc and lead, which is provided with a lining or coating of tin (18) disposed on at least the interior surface of the fixture.

10 Claims, 1 Drawing Sheet

PLUMBING FIXTURE CARRYING DRINKING WATER COMPRISED OF A COPPER ALLOY

FIELD OF THE INVENTION

This invention relates to plumbing fixtures such as faucets providing potable water comprised of copper and copper alloys such as brass having the interior surfaces which come in contact with the water coated with tin.

BACKGROUND OF THE INVENTION

Plumbing fixtures having an interior lining or coating in order to prevent leaching or stripping of various metals into the water flowing through these fixtures are known. Thus, for example, German published patent application DE OS 35 15 718 describes a water spigot with a mixing and metering valve. In this fixture the interior bore of the water spigot is coated with plastic. This prevents leaching or washing-out of, for example, lead and zinc from brass fixtures or the stripping of copper from copper fixtures into the water. However, this plastic lining is very expensive to apply.

German patent DE PS 14 192 discloses a fixture body which has its interior tin-plated. However, the tin-plated interior is provided only in order to enable later casting of a lead lining on the inside of the metal body which is itself in contact with the liquid flowing therethrough.

German patent DE-PS 22 802 discloses valves, spigots, pump bodies or other machine parts having a protective coating of tin, among other materials, to protect against chemical attack by chemical agents. However, casting cores are inserted into the iron core to be protected which together with the iron core form a casting mold. This casting mold is lined with tin, thus creating a massive cast protective body of tin. Because of the thickness of the protective tin body, it cannot be employed with fixtures having threads.

It is also possible to utilize fixtures comprised of alloys, the components of which are considered to be physiologically safe. For example, bronze as a pure alloy of copper and tin. However, such alloys are relatively expensive.

Lead free brass alloys or alloys which prevent the leaching of tin due to the alloy's components are also known. However, such brass alloys exhibit disadvantageous machining properties such as forming machining tool clogging long chips upon machining.

Bismuth instead of lead can also be added to a brass alloy in order to maintain the requisite machining properties of the alloy. Also, arsenic or antimony can be used to combat so-called "de-zincing". However, the nature of such alloy is changed. This presents difficulties with recycling.

The present invention avoids the aforediscussed disadvantages and provides a plumbing fixture comprised of an inexpensive, conventional brass alloy wherein metals are not leached-out or stripped into the water flowing through the fixture.

SUMMARY OF THE INVENTION

The instant invention comprises a plumbing fixture such as a faucet for carrying drinking water comprised of copper and its alloys which is provided with an interior lining or coating comprised of tin. The alloys of copper of which the plumbing fixture is fabricated include those including zinc and lead, e.g., brass.

The tin lining or coating is quite thin, having a thickness of about 2 to about 4 μm. The tin coating or layer is applied to at least the interior surfaces of the fixture, including the threads. The tin coating or lining is applied chemically from a liquid chemical tin coating bath. Thus, water flowing through the fixture comes in contact only with the relatively inert tin lining, thereby eliminating the problems of metals such as lead leaching into the drinking water. Furthermore, the total thickness of the tin coating of a maximum of 4 μm is within the tolerance range of 0.025 to 0.05 mm of a customarily used screw thread based on the metric or inch system of the finished fixture. This means that the coated fixture does not require any additional working or finishing operations.

DESCRIPTION OF THE PREFERRED EMBODIMENT

Figure 1:
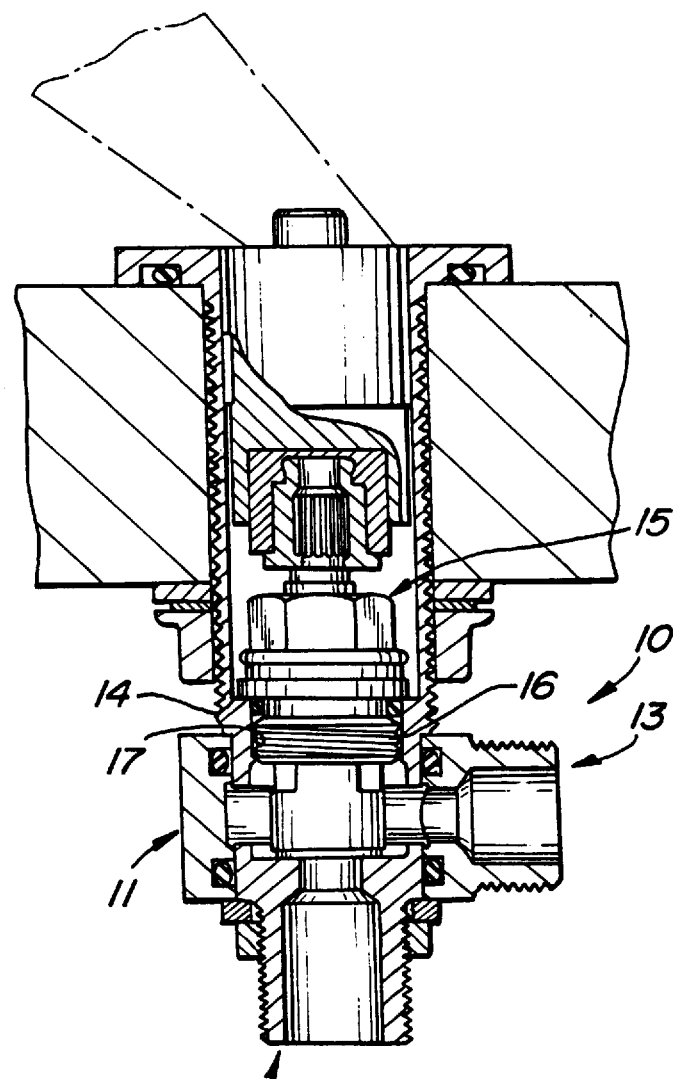
FIG. 1 is a sectional view of a plumbing fixture.

The interior of the fixture 10 has applied thereto a coating or lining of tin 18 having a thickness of from about 2 to about 4 μm. This coating is applied chemically to at least the interior surfaces of the fixture, particularly those surfaces in contact with water. The coating 18 is generally of a uniform thickness. It is applied chemically from a tin bath at a temperature of from 50° to 80° C.

The tin chemical baths are known and conventional. One tin bath that can be used contains:

20 grams of tin II per liter of water 1 gram of tin IV per liter of water 150 grams acid concentrate per liter of water A bath composition of this type makes it possible to chemically tin-plate uniformly and completely even those fixtures which are constructed in a complicated manner and provided with many different interior chambers, so that essentially no washing out or stripping by the liquid flowing through can be detected. The fixtures of brass alloys treated in such a tin bath are suited for use as fixtures carrying drinking water. They also meet the requirements in the United States in connection with water sanitation.

Based on the high tin deposition speed of the chemical plating process of the invention it is possible, following complete cleaning of the fixture body, to apply a uniform and unbroken coating of tin to all surfaces within a time of only 20 to 40 minutes. The coating or lines dependably and permanently prevents the washing-out or stripping of possibly harmful components from fixtures carrying drinking water and particularly those consisting of brass alloys.

Before being subjected to the tin deposition process the inner and outer surfaces, but particularly the inner surfaces, of the fixture body are cleaned, in particular of particles.

In another embodiment of the invention a tin base coating about 1 μm thick is electro-chemically applied onto the surface of the fixture prior to the currentless or chemical application of the tin. Thus, the chemically applied 2 to 4 μm thick layer of tin is the top coat on the electro-chemically applied base coat.

Because of this electro-chemical tin plating with a very thin, a maximum of about 1 μm thick tin coating, the surfaces of the fixture have a homogeneous contact ability at the start of chemical tin plating, which offers a particularly good base for the uniform chemical deposition of tin. This not only has an advantageous effect on the uniformity of the tin cover coating, but also on the permanence.

For electro-chemical tin plating the conventional bath is comprised of 0.068 liter sulfuric acid per liter water and 15 grams tin II per liter of water. In addition, usually a basic additive and a brightener are added to this bath.

Complementing the already described process steps, it is also possible in an advantageous manner during the course of electro-chemical tin plating to stir the bath during tin plating or to pull the fixtures to be coated through the bath by means of an appropriate device. The uniformity of tin plating is improved by this.

Finally, the process in accordance with the invention has particularly advantageous results if the current density during electro-chemical tin plating is 1.5 to 2 A per $dm^2$.

Referring to the drawings a fixture as a whole is indicated by the reference numeral 10 in the drawing figures.

The fixture 10 is a shut-off valve which is a component of a plumbing fixture with a valve housing 11 having an inlet connector 12, an outlet connector 13 and a receiving connector 14 for an upper valve part 15. The upper valve part 15 is disposed via an exterior thread projection 16 in the inner thread 17 of the receiving connector 14.

The fixture 10 is made of brass with lead and zinc portions and has been provided, as described above, on the inside and outside with a chemically applied tin coating, not shown in FIG. 1.

Figure 2:
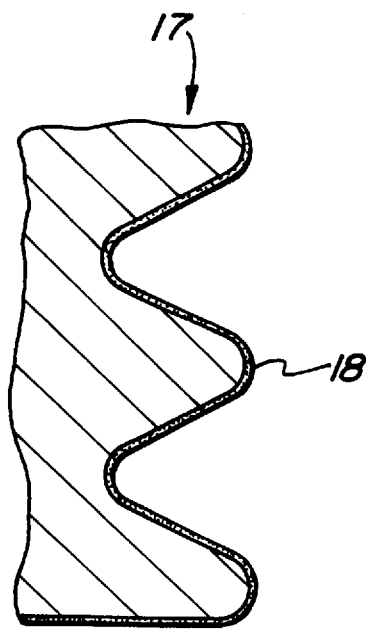
FIG. 2 is an enlarged partial sectional view of an interior thread of the fixture of FIG. 1 showing the tin coating.

An enlarged section of the inner thread 17 of the receiving connector 14 can be seen in FIG. 2. The fixture has a uniform cover coating of tin, indicated by reference numeral 18, even in the area of the thread surface.

Such a fixture 10, which is provided with a tin cover coating 18 also in the area of the thread, need not be worked again after tin plating, because the total thickness of the tin cover coating 18 lies within the tolerance range of the finished fixture 10 as well as that of the thread 17. However, it of course is possible to afterwards apply chrome-plate, for example on the outside of the fixture body, for visual reasons.

Although the invention has been described in detail with reference to certain preferred embodiments, variations and modifications exist within the scope and spirit of the invention as described and defined in the following claims.

What is claimed is:

1. A metallic plumbing fixture for carrying potable water comprised of copper or a copper alloy having a tin coating disposed on at least the interior surface of the fixture which surface is in contact with said potable water.

2. The fixture of claim 1 wherein said tin coating has a thickness of from about 2 to about 4 $\mu$m.

3. The fixture of claim 2 wherein said coating is chemically applied.

4. The fixture of claim 3 wherein said tin coating is electroless tin.

5. The fixture of claim 3 wherein said tin coating is of generally uniform thickness.

6. The fixture of claim 4 wherein said fixture includes a base layer of electroplated tin disposed between said electroless tin coating and the surface of said fixture.

7. The fixture of claim 6 wherein said base layer has a maximum thickness of about 1 $\mu$m.

8. The fixture of claim 1 wherein said fixture is comprised of a copper alloy including zinc and lead.

9. The fixture of claim 8 wherein said copper alloy is brass.

10. The fixture of claim 1 wherein the interior and exterior surfaces of said fixture have a tin coating disposed thereon.

* * * * *